(12) United States Patent
Fei et al.

(10) Patent No.: US 9,832,309 B2
(45) Date of Patent: Nov. 28, 2017

(54) METHOD AND APPARATUS TO DETECT A STALE NUMBER

(71) Applicant: MOTOROLA SOLUTIONS, INC., Schaumburg, IL (US)

(72) Inventors: Xun Fei, Sichuan (CN); Dajun Chen, Sichuan (CN); Yong Tian, Sichuan (CN); Hongxia Wang, Sichuan (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/312,923

(22) PCT Filed: Jul. 5, 2015

(86) PCT No.: PCT/CN2015/083347
§ 371 (c)(1),
(2) Date: Nov. 21, 2016

(87) PCT Pub. No.: WO2017/004768
PCT Pub. Date: Jan. 12, 2017

(65) Prior Publication Data
US 2017/0201622 A1    Jul. 13, 2017

(51) Int. Cl.
*H04M 3/42* (2006.01)
*H04M 3/436* (2006.01)
*H04M 1/2745* (2006.01)

(52) U.S. Cl.
CPC . *H04M 3/42102* (2013.01); *H04M 1/274508* (2013.01); *H04M 1/274516* (2013.01); *H04M 3/42382* (2013.01); *H04M 3/436* (2013.01); *H04M 2203/558* (2013.01)

(58) Field of Classification Search
None
See application file for complete search history.

(56) References Cited

U.S. PATENT DOCUMENTS

| | | | |
|---|---|---|---|
| 5,978,462 A * | 11/1999 | Fuhrmann | H04M 3/51 379/115.01 |
| 6,961,590 B1 * | 11/2005 | Toebes | H04M 1/274558 379/218.01 |
| 7,189,132 B2 | 3/2007 | Nacik et al. | |
| 8,509,414 B2 | 8/2013 | Bhattiprolu et al. | |
| 8,626,137 B1 | 1/2014 | Devitt et al. | |
| 8,666,370 B2 | 3/2014 | Park | |
| 2004/0266414 A1 | 12/2004 | Likwornik | |
| 2006/0136520 A1 | 6/2006 | Leppinen et al. | |

(Continued)

OTHER PUBLICATIONS

PCT/CN2015/083347 International Search Report and Written Opinion of the International Searching Authority dated Mar. 25, 2016 (8 pages).

*Primary Examiner* — Harry S Hong
(74) *Attorney, Agent, or Firm* — Michael Best & Friedrich LLP (57) ABSTRACT

A method and apparatus for detecting a stale number. A stale number detection device obtains a call number, a call number contact creation date, and a call number issue date for the call number. The stale number detection device determines that a stale number state exists when the call number issue date is later than the call number contact creation date. The stale number detection device generates a stale number notification based on the stale number state.

20 Claims, 6 Drawing Sheets

(56) References Cited

U.S. PATENT DOCUMENTS

| | | | |
|---|---|---|---|
| 2008/0043948 A1* | 2/2008 | Schultz | H04M 15/00 379/112.05 |
| 2009/0010416 A1* | 1/2009 | Pines | H04M 3/4931 379/218.01 |
| 2012/0076292 A1* | 3/2012 | Schultz | H04M 15/00 379/219 |
| 2013/0251128 A1* | 9/2013 | Zhang | H04M 1/27 379/112.01 |
| 2016/0248911 A1* | 8/2016 | Gudger | H04M 3/4211 |

* cited by examiner

METHOD AND APPARATUS TO DETECT A STALE NUMBER

BACKGROUND OF THE INVENTION

Telephone numbers are a critical and limited resource. In the past, almost every new telephone service subscriber received a "clean" never-before-assigned telephone number. However, as the demand for telephone numbers has increased, the incidence of numbers that have been previously assigned has also increased. The increase in cellular networks, voice over internet protocol (VoIP), and telephone service subscribers generally has led to increased demand for telephone numbers. To continue to meet the demand for new telephone numbers for new subscribers, given the limited number of telephone numbers available, service providers recycle previously-assigned telephone numbers (i.e., a service provider will issue to a new subscriber a telephone number that was previously used by a former subscriber). However, this recycled telephone number is stored and/or remembered by others as still associated with the former subscriber. For example, many individuals, corporations, and other entitles increasingly use electronically-stored contact databases that store the names of people and related contact information, including telephone numbers, on computers, smart telephones, or other communications equipment and devices.

The increased recycling of telephone numbers and the increased use of electronic contact databases has led to an increase in "stale numbers." A stale number is a telephone number that, although it corresponds to a name of a person in a contact database, no longer corresponds to that person in actuality (e.g., the person has a new telephone number, and cannot be reached at the old telephone number), but rather now belongs to another person.

Stale numbers can lead to a number of problems. For example, a new subscriber to a telephone service provider may receive a recycled number (e.g., a service provider will issue to a new subscriber a telephone number that was recently used by a former subscriber). Because the new subscriber has a telephone number that was recently used by the former subscriber, it is likely that the telephone number is a stale number in the contact databases containing contact information for the former subscriber. The new subscriber may receive stale number (i.e., wrong number) calls, which can be disruptive and undesirable to the new subscriber. Similarly, those trying unsuccessfully to contact the former subscriber are inconvenienced. In another example, a company's customer contact database may have stale numbers because customers change telephone numbers and neglect to inform the company. This failure to inform may cause the company to inadvertently provide private information to someone other than the customer. For example, some financial institutions allow customers to register telephone numbers at which they can receive text or voice messages alerting them to their account balance or other sensitive information. If the financial institution has a stale number stored for a customer, that customer's private information may be revealed to a third party.

Accordingly, there is a need for a method and apparatus to detect a stale number.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some embodiments of the invention include a method for detecting a stale number. In one embodiment, the method includes obtaining, by a processor, a call number and a call number contact creation date. The method further includes determining, by the processor, a call number issue date for the call number. The method further includes determining, by the processor, that a stale number state exists when the call number issue date is later than the call number contact creation date. The method also includes generating, by the processor, a stale number notification based on the stale number state. Some embodiments include an device for detecting a stale number. In one embodiment, the device includes a processor, which is configured to obtain a call number and a call number contact creation date. The processor is further configured to determine a call number issue date for the call number. The processor is further configured to determine that a stale number state exists when the call number issue date is later than the call number contact creation date. The processor is further configured to generate a stale number notification based on the stale number slate.

Figure 1:
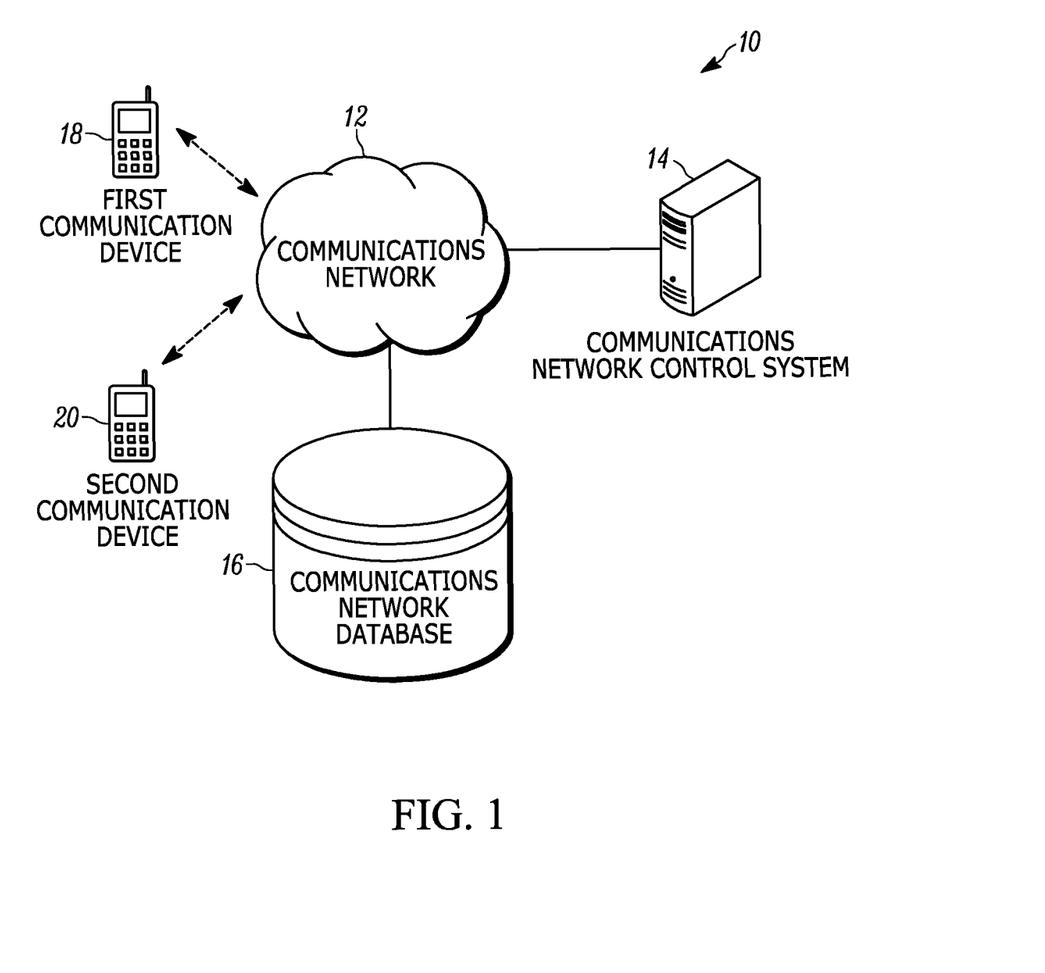
FIG. 1 illustrates a telecommunications system in accordance with some embodiments.

FIG. 1 illustrates a telecommunications system 10. The telecommunications system 10 includes a communications network 12, a communications network control system 14, a communications database 16, a first communication device 18, and a second communication device 20. For ease of description, the telecommunications system 10 illustrated in FIG. 1 includes one communications network 12, communications network control system 14, communications network database 16, first communications device 18, and second communication device 20. Other embodiments may include more than one of each of these components.

The communications network 12 interconnects the communications network control system 14, the communications network database 16, the first communication device 18, and the second communication device 20. The communications network 12 passes voice traffic, data traffic, or both, to, from, and between the communications network control system 14, the communications network database 16, the first communication device 18, and the second communication device 20 using suitable network protocols, connections, and equipment. The communications network 12 may include landline telephone lines, cellular networks, land-mobile radio networks, local and wide area data networks, and or any other communications network type. The communications network 12 may include or have one or more connections to the public switched telephone network (PSTN) and the Internet. The communications network 12 may switch or route network traffic, including voice telephone calls (e.g., cellular and landline calls), digital and analog radio communications, voice over internet protocol (VoIP), short message service (SMS) messages and multimedia message service (MMS) messages (collectively referred to herein as "text messages"), transmission control protocol/internet protocol (TCP/IP) data traffic, and the like.

The communications network control system 14 is capable of receiving call requests from the first communication device 18 and the second communication device 20, and completing those call requests. A call request includes, for example, a request to place a voice telephone call in some instances, and a request to send a text message in other instance. Accordingly, completing a call request may include connecting a voice telephone call between, for example, the first communication device 18 and the second communication device 20, or sending a text message, for example, from the first communication device 18 to the second communication device 20. The communications network control system 14 is configured to complete a call request by interfacing with network equipment (not shown) in the communications network 12, including the communications network database 16.

The communications network database 16 electronically stores information regarding the communications network 12, including, for example, information relating to the telephone numbers assigned to subscribers or users of the communications network 12. The communications network control system 14 is configured to read and write such information to and from the communications network database 16. In the illustrated embodiment, the communications network database 16 is a database housed on a suitable database server and accessible by the communications network control system 14 and other systems (not shown) over the communications network 12. In alternative embodiments, the communications network database 16 may be located on the communications network control system 14, or on a system external to the communications network 12 and accessible over one or more intervening networks.

The first communication device 18 and the second communication device 20 are electronic communication devices capable of sending and receiving voice and data traffic to and from the communications network 12. The first communication device 18 and the second communication device 20 are configured to terminate and originate voice calls, text messages, and other voice and data transmissions over the communications network 12. In many of the embodiments described herein, the first communication device 18 and the second communication device 20 are smart telephones. However, in alternative embodiments, either or both the first communication device 18 and the second communication device 20 may be other electronic communication devices including, for example, landline telephones, portable radios, tablet computers, laptop computers, personal digital assistants (PDAs), and the like.

In alternative embodiments, either or both of the first communication device 18 and the second communication device 20 may be an automated messaging system. An automated messaging system is capable of originating and terminating voice calls, text messages, and other communications, either alone, or by interfacing with other network equipment (not shown). The automated messaging system may be part of a larger network at a company, including, for example, a financial institution or an insurance company. In such embodiments, the company may use the automated messaging system to send text messages or automated voice calls to its customers over the communications network 12. For example, in some embodiments, the first communication device 18 may be an automated messaging system, which sends a text message over the communications network 12 to the second communication device 20, which may be a customer's smart telephone. Alternatively, the automated messaging system may receive voice calls or text messages from a customer. Automated messaging systems may also include, for example, internet websites, email distribution systems, and the like.

Figure 2:
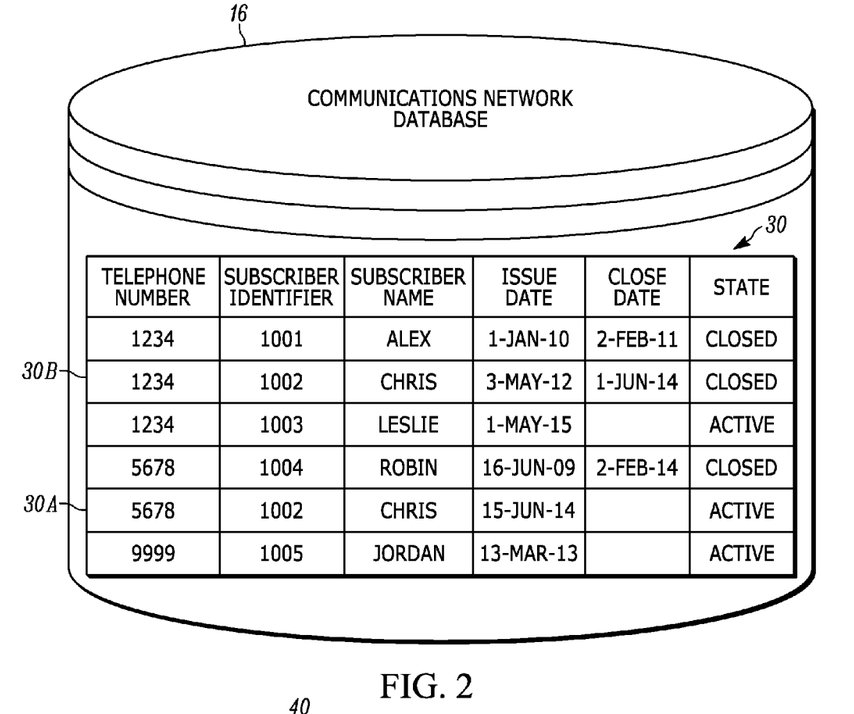
FIG. 2 illustrates a communications network database in accordance with some embodiments.

As illustrated in FIG. 2, communications network database 16 includes a data table 30. The data table 30 stores information indicating the telephone numbers that are or were assigned to particular subscribers, and the time period of the assignment. In alternative embodiments, the telephone numbers may be other types of numbers that uniquely identify a subscriber within a public land mobile network (PLMN), or other type of public or private wireless communications network. In alternative embodiments, a call number may be an alphanumeric identifier. Each record in the data table 30 includes a telephone number, a subscriber identifier, a subscriber name, the issue date (i.e., the date the number was issued to the subscriber), the date the number was closed (i.e., when the number was no longer issued to that subscriber), and the state of the record. The state of the record indicates whether the record is active or closed. An active record indicates that the telephone number in the record is still issued to that subscriber. A closed record indicates that the telephone number in the record is no longer issued to that subscriber. For example, in the data table 30, the data record 30A stores information showing that the telephone number "5678" was assigned to a subscriber named "Chris" on "Jun. 15, 2014," and is still active. Someone calling "5678" in an attempt to reach "Chris" would have a chance to reach Chris at that telephone number. In another example, the data record 30B stores information showing that the telephone number "1234" was assigned to "Chris" on "May 3, 2012," and was no longer assigned to "Chris" as of "Jun. 1, 2014" Someone placing a call to telephone number "1234" in an attempt to reach "Chris" would be placing a call to a stale telephone number and would not be able to reach "Chris." In alternative embodiments, the data table 30 in the communications network database 16 may hold more information or store the information in different formats.

Figure 3:
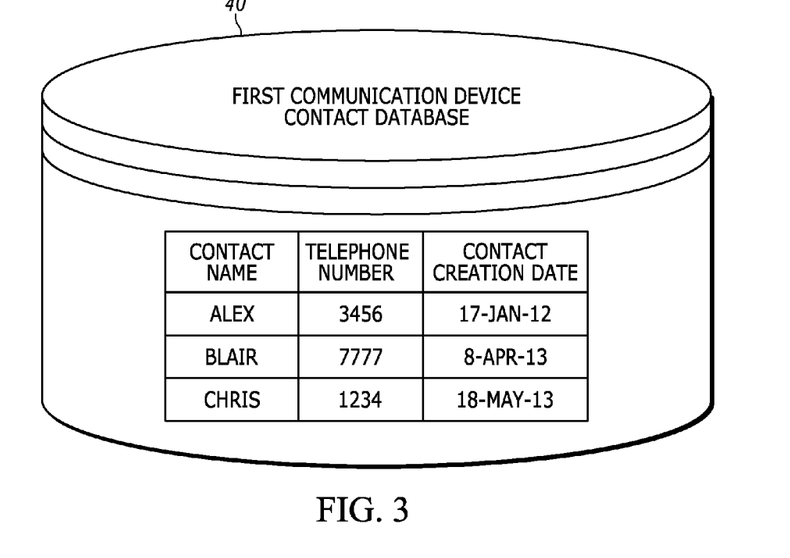
FIG. 3 illustrates a first communication device contact database in accordance with some embodiments.

FIG. 3 illustrates a first communication device contact database 40. The first communication device contact database 40 is used by the first communication device 18 to store and retrieve contact information. The contact information is stored in contact records. Each contact record in the contact database includes a name for the contact, a telephone number for the contact, and the contact creation date (i.e., the date the contact was entered into the first communication device contact database 40). In some embodiments, each contact record includes further contact information, including, for example, a street address, an email address, and alternate telephone number, and the like. In some embodiments, the first communication device contact database 40 is electronically stored in a memory of the first communication device 18. In other embodiments, the first communication device contact database 40 is stored apart from the first communication device 18, and access through suitable network protocols via the communications network 12, or other wired or wireless networks or data connections.

Figure 4:
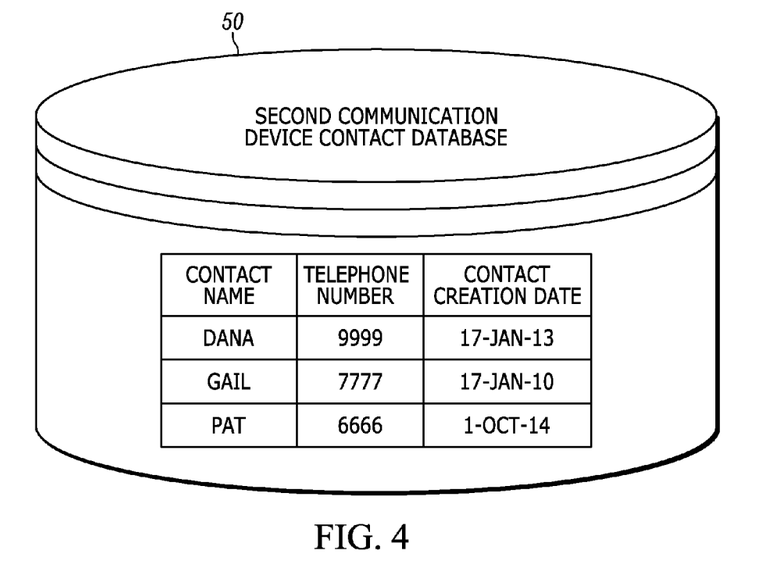
FIG. 4 illustrates a second communication device contact database in accordance with some embodiments.

FIG. 4 illustrates a second communication device contact database 50. The second communication device contact database 50 is used by the second communication device 20 to store and retrieve contact information. The second communication device contact database 50 is configured similarly to the first communication device contact database 40.

Figure 5:
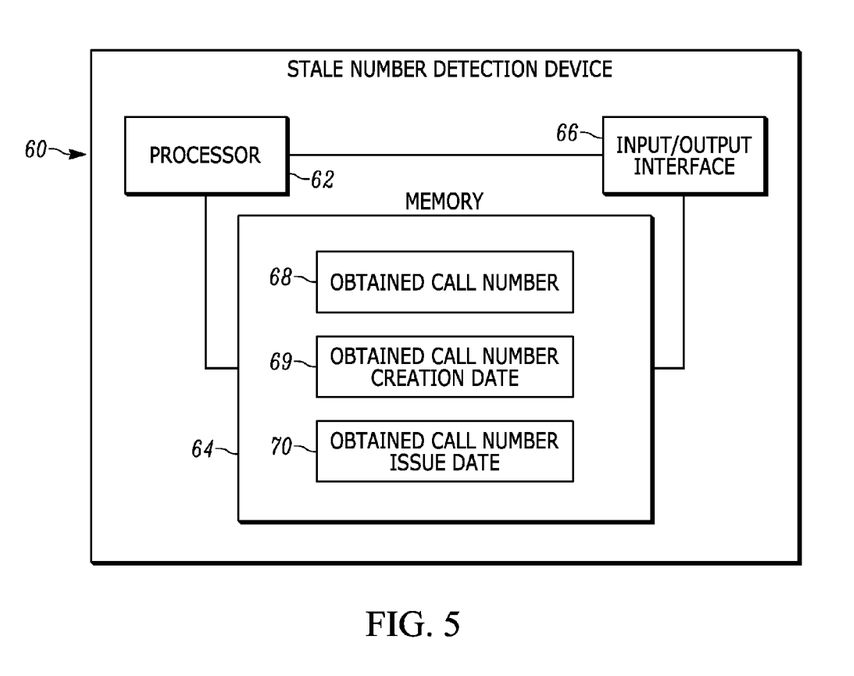
FIG. 5 illustrates a stale number detection device in accordance with some embodiments.

FIG. 5 illustrates a stale number detection device 60. The stale number detection device 60 includes a processor 62 (e.g. a microprocessor or another suitable programmable device), a memory 64 (i.e., a computer-readable storage medium), and an input/output interface 66. The processor 62, the memory 64, and the input/output interface 66, as well as the other various modules and components, are connected by one or more control or data buses to enable communication therebetween.

The memory 64 may include a program storage area and a data storage area. The processor 62 is connected to the memory 64 and executes computer readable instructions ("software") stored in a random access memory (RAM) of the memory (e.g., during execution), a read only memory (ROM) of the memory (e.g., on a generally permanent basis), or another non-transitory computer readable medium. For example, software for placing and receiving calls, detecting stale numbers, and generating stale number notifications, as described below, may be stored in the memory 64. The software may include firmware, one or more applications, program data, filters, rules, one or more program modules, other executable instructions, or combinations thereof. The processor 62 is configured to retrieve software from the memory 64 and execute the software. The processor 62 is configured to store and retrieve data to and from a random access memory of the memory, a temporary register of the memory, a buffer of the memory, and the like.

The processor 62 is further configured to obtain and store in the memory 64 an obtained call number 68, as obtained call number contact creation date 69, and an obtained call number issue date 70. The obtained call number 68 may be retrieved from a local or remote database or may be part of a call request (e.g., a request to place a call to, or receive a call from, a telephone number), as described herein. The obtained call number contact creation date 69 may be retrieved from a local or remote database, far example, the first communication device contact database 40 and the second communication device contact database 50. The obtained call number issue date 70 may be retrieved from a local or remote database, for example, the communications network database 16. In some embodiments, the processor 62 is configured to compare the obtained call number contact creation date 69 and the obtained call number issue date 70 to determine a stale number state, as described below.

The input/output interface 66 is configured to receive input and to provide system output. In some embodiments, the input/output interface 66 receives user input provided via, for example, a keypad, a touch screen, a scroll ball, buttons, and the like. In some embodiments, the input/output interface 66 is coupled to an external database (e.g., the first communication device contact database 40, the second communication device contact database 50, and the communications network database 16) via the communications network 12 or another wired or wireless connection. System output can be provided via a display device such as a liquid crystal display (LCD), touch screen, and the like. The input/output interface 66 can include a graphical user interface (GUI) (e.g., generated by the processor 62, from instructions and data stored in the memory 64, and presented on a touch screen) that enables a user to interact with the stale number detection device 60. The input/output interface 66 may also include one or more network interfaces that allow the stale number detection device 60 to be coupled to, and communicate with (e.g., over the communications network 12 or other wired or wireless connections) other devices (e.g., the first communication device contact database 40, the second communication device contact database 50, and the communications network database 16).

The stale number detection device 60, its functions as described below, or both, may be incorporated into the communications network control system 14, the first communication device 18, and the second communication device 20. For example, each of the communications network control system 14, the first communication device 18, and the second communication device 20 generally include a processor, a memory, and an input/output interface. Accordingly, in various embodiments, the stale number detection device 60 may be implemented through hardware, software, firmware, or a combination thereof in one or more of the communications network control system 14, the first communication device 18, and the second communication device 20. In alternative embodiments, the stale number detection device 60 is implemented as a standalone device, which can be attached to, or accessed remotely by, another device, including, for example, the communications network control system 14, the first communication device 18, the second communication device 20, and similar electronic devices. In such embodiments, the stale number detection device 60 is attached or accessed using suitable electronic connectors, cabling, wired or wireless networks, or combinations thereof.

Figure 6:
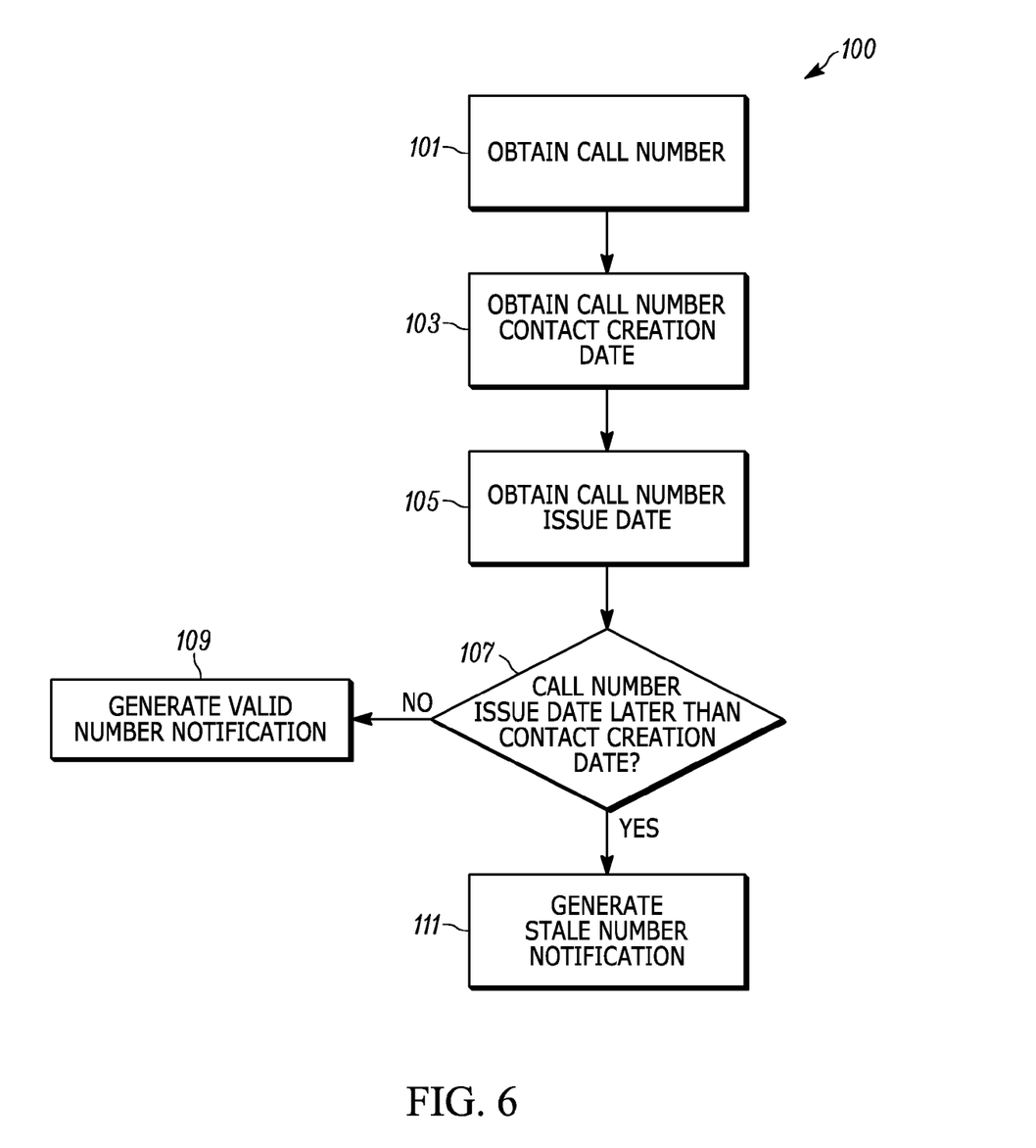
FIG. 6 illustrates a method for detecting a state number in accordance with some embodiments.

FIG. 6 illustrates a method 100 for detecting a stale number using the stale number detection device 60. At block 101, the stale number detection device 60 obtains a call number. In one example, the call number may be the telephone number "1234." At block 103, the stale number detection device 60 obtains a call number contact creation date. The call number contact creation date is the date when a contact record containing the call number was created. For example, the contact record containing the telephone number "1234" may be obtained from the first communication device contact database 40. As illustrated in FIG. 3, the contact record for a contact named "Chris," contains the telephone number "1234" and a contact creation date of "May 18, 2013."

In some embodiments, the call number and the call number contact creation date may be obtained when the stale number detection device 60 receives a call request from a request device. A call request may be a request to place a voice telephone call or send a text or data message. In one example, the request device is the first communication device 18, where a user of the first communication device 18 requests to place a voice call or requests to send a text or data message to "Chris." The first communication device 18 may provide a graphical user interface showing a list of contacts of the user, which is obtained from the first communication device contact database 40. Through the graphical user interface, the first communication device 18 receives a user selection of "Chris." The first communication device 18, in turn, obtains a telephone number and contact creation date for "Chris" from the first communication device contact database 40. The first communication device 18 then generates and sends the call request with the telephone number "1234" and the contact creation date of "May 18, 2013" to the stale number detection device 60. As noted above, the stale number detection device 60 may be incorporated into the communications network control system 14, the first communication device 18, or the second communication device 20, or it may be a standalone device. Alternatively, first communication device 18 may receive, through the graphical user interface, a telephone number, and retrieve the call number contact creation date from the contact record that contains the telephone number. In other instances, the request device is the second communication device 20, the communications network control system 14, or another device.

In some instances, a call request is a request to check a contact status to determine if the call number contained in the contact is current or stale. For example, a user of the first communication device 18 may want to check the contact status for "Chris" (e.g., check to see if the telephone number for "Chris" is stale) without placing a voice telephone call or sending a text or data message. The first communication device 18 obtains, from the first communication device contact database 40, a telephone number and contact creation date for "Chris." The first communication device 18 then generates and sends the call request to check the contact status, including the telephone number "1234" and the contact creation date of "May 18, 2013" to the stale number detection device 60.

Continuing with the operation of FIG. 6 after obtaining the call number and the call number contact creation date, at block 105, the stale number detection device 60 obtains the call number issue date for the telephone number "1234." In some embodiments, the call number issue date may be determined from the communications network database 16. For example, as illustrated in FIG. 2, the data table 30 contains a call number issue date of "May 1, 2015" for the telephone number "1234."

At block 107, the stale number detection device 60 compares the call number issue date and the call number contact creation date. When the issue date is earlier than the call number contact creation date, then the stale number detection device 60 determines that the contact record contains a valid telephone number, because the contact was created after the current subscriber received the telephone number. Thus, when the call number issue date is earlier than the call number contact creation date, the stale number detection device 60 will indicate that a valid number state exists and generate a valid number notification, at block 109. In response to the generated valid number notification, generally, the system 10 proceeds to complete the call request. Completing the call request may vary depending on the type of call request and includes, for example, placing a voice telephone call, sending a text message, and accepting a voice telephone call or text message. Additionally, the generated valid number notification is sent to the request device that initiated the method 100. The valid number notification may be displayed by the request device (e.g., the first communication device 18 or the second communication device 20).

However, when the call, number issue date ("May 1, 2015") is later than the call number contact creation date ("May 18, 2013"), then the stale number detection device 60 determines that the contact record contains a stale (i.e., incorrect) number because the contact was created before the current subscriber received the telephone number. Thus, when the call number issue date is later than the call number contact creation date, the stale number detection device 60 will indicate that a stale number state exists and generate a stale number notification based on that state, at block 111. The stale number notification may include an indication that the obtained call number is a stale number, and other pertinent information, such as the call number issue date. In some embodiments, the stale number notification is sent externally to the stale number detection device 60 (e.g., to the second communication device 20, the communications network control system 14, or another device). In other embodiments, the stale call notification is retained on the stale number detection device 60 (e.g., in the memory 64). For example, when the stale number detection device 60 is incorporated into the communications network control system 14, the communications network control system 14 may retain the stale call notification, and deny the call request without notifying the request device.

In some embodiments, the stale number detection device 60 may obtain the call number, the call number contact creation date, and the call number issue date simultaneously, or in a different order than described above. For example, the call request may be a request to accept a voice telephone call or a text message, sent from the communications network control system 14 to a recipient device (e.g., the second communication device 20). The call request may include, for example, a call number and a call number issue date, where the call number is the call number of the request device. For example, the stale number detection device 60 may receive a call request from the call number "9999" that includes a call number issue date of "Mar. 13, 2013" (see FIG. 2). The stale number detection device 60 may then obtain the call number contact creation date for the telephone number "9999" from a local database, for example, the second communication device contact database 50. As illustrated in FIG. 4, the second communication device contact database 50 contains a creation date of "Jan. 17, 2013," for the telephone number "9999." In this example, because the call number issue date "Mar. 13, 2013") is later than the call number contact creation date ("Jan. 17, 2013") the stale number detection device 60 determines that the contact record contains a stale (i.e., incorrect) number because the contact was created before the current subscriber received the telephone number. Accordingly, the stale number detection device 60 will indicate that a stale number state exists and generate a stale number notification based on that state, as described above.

Figure 7:
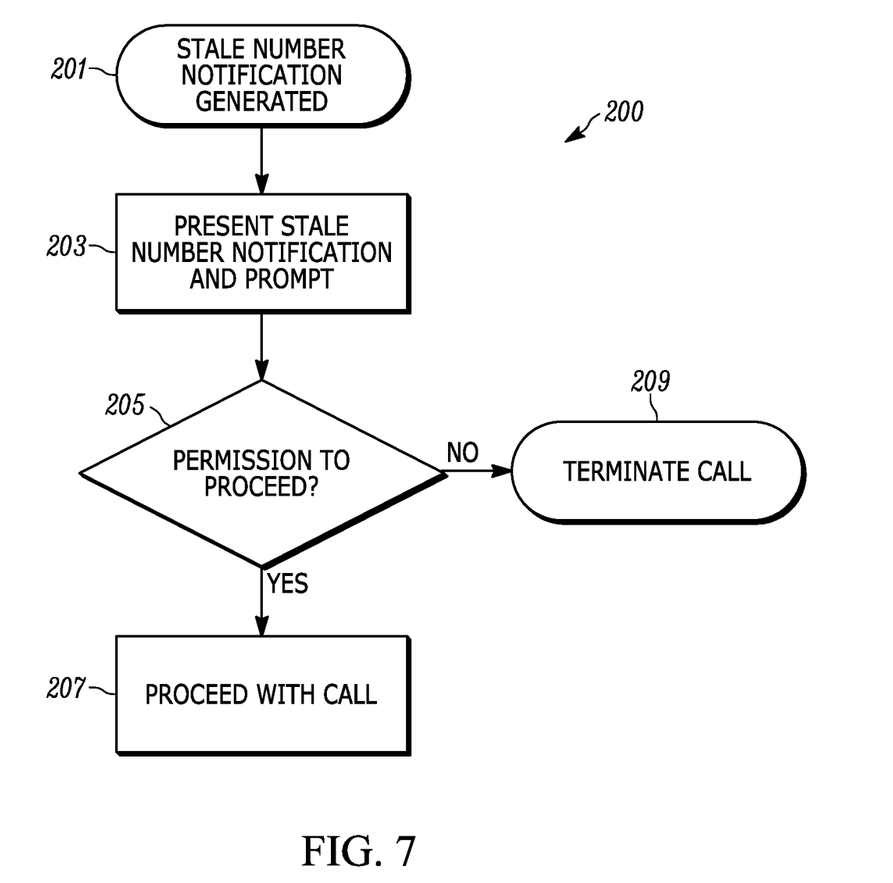
FIG. 7 illustrates a method for processing a call request where a stale number notification has been generated in accordance with some embodiments.

FIG. 7 illustrates a method 200 for processing a call request where a stale number notification has been generated. At block 201, the stale number detection device 60 has generated a stale number notification, according to method 100, in response to receiving a call request. For example, the stale number detection device 60 may have received a call request, from a request device, to place a voice telephone call or send a text message to a call number, which it determined was stale. At block 203, the stale number notification is presented along with a prompt. Presenting the stale number notification and the prompt may include, for example, sending them to the request device (e.g., the communications network control system 14, the first communication device 18, or the second communication device 20) through the communications network 12, or presenting them to a user through a graphical user interface or other suitable input/output mechanism (e.g., the of the input/output interface 66). The prompt requests permission to proceed with the call request.

At block 205, when the stale number detection device 60 receives permission to connect the call, the system 10 will proceed with the call at block 207. In some embodiments, proceeding with the call request includes the system 10, for example, placing a telephone call, accepting a voice telephone call, sending a text message, or accepting a text message. For instance, the stale number detection device 60 provides an indication to the communications network control system 14 that permission was received, and the communications network control system 14 connects a voice telephone call between the first communication device 18 and the second communication device 20. However, when the stale number detection device 60 does not receive permission (e.g., it receives a negative response or no response to the prompt), the stale number detection device 60 will deny the call request and terminate the call at block 209. Terminating the call request includes the system 10, for example, not placing (i.e., not connecting) a telephone call, not accepting a voice telephone call, not sending a text message, or not accepting a text message. In some embodiments, the stale number detection device 60 returns an error message to the request device indicating that a) the call request was denied because the call number had been assigned to a new subscriber, and b) that the contact information used to generate the call request is stale.

Figure 8:
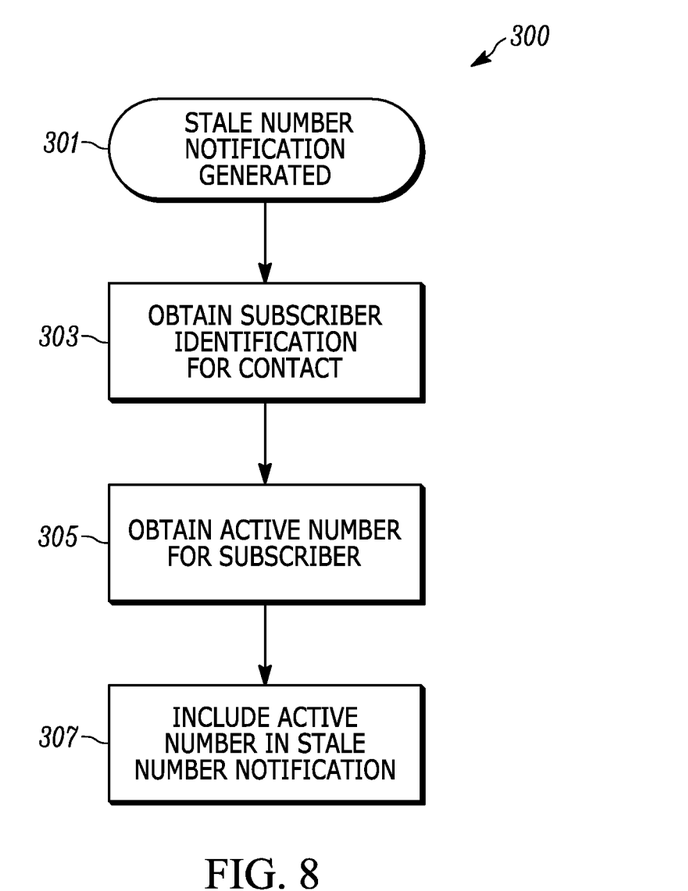
FIG. 8 illustrates a method for providing an active number when a stale number is detected in accordance with some embodiments.

FIG. 8 illustrates a method 300 for including an active number along with a stale number notification when a stale number is present in a call request. At block 301, the stale number detection device 60 has generated a stale number notification, according to method 100, in response to receiving a call request. For example, as described above with respect to method 100, a call request including the call number "1234" and a call number contact creation date of "May 18, 2013" caused the stale number detection device 60 to generate a stale number notification. After this notification is generated, at block 303, the stale number detection device 60 obtains the subscriber identifier for the call number issued to the subscriber at the time of the call number contact creation date.

In some embodiments, the stale number detection device 60 may obtain this information by querying the communications network database 16. For example, the query may search for a record in data table 30 where the telephone number is equal to "1234" and the contact creation date of "May 18, 2013," falls on or between the issue date and the close date for the record. In this example, the subscriber identifier for data record 30B ("1002") is responsive to the query because "May 18, 2013," falls between the issue date of "May 3, 2012," and the close date of "Jun. 1, 2014," and the telephone number is "1234."

At block 305, the stale number detection device 60 uses the subscriber identifier "1002" to obtain an active telephone number for the subscriber. For example, the stale number detection device 60 may query data table 30 for a record where the subscriber identifier is equal to "1002" and the record state is "active." In this example, data record 30A is responsive to this query and provides the stale number detection device 60 with the active telephone number "5678." At block 307, the stale number detection device 60 includes the active telephone number for the subscriber that it obtained in the stale number notification generated at block 301.

As noted above, a call request may be a request to check a contact status to determine when the call number contained in the contact is valid or stale. When a call request is a request to check a contact status, the stale number notifications generated, if any, include an indication that the contact record is stale. In some embodiments, the stale number notification may include an active number for the contact record, which can be determined according to method 300. In some embodiments, the request to check a contact status includes multiple contact records sent and received as a group and processed either sequentially or in parallel. In some embodiments, each contact in the contact database of the request device is checked automatically (i.e., independent of further manual input) after the request to check a contact status is initiated. In embodiments where multiple contact records are checked, the stale number notification may contain the results for all of the contacts checked in a single notification or in individual notifications.

Accordingly, embodiments of the systems and methods described herein enable, for instance, an individual having a recently recycled telephone number to use the stale number detection device 60 to detect whether an incoming call or text message originated from a user having a stale contact that incorrectly associates the recycled telephone number with someone other than the individual currently assigned to the recycled telephone number. Other embodiments enable, for instance, an individual placing a call or sending a text message to use the stale number detection device 60 to detect whether the call or text message is being sent to a stale number before the call is completed or the message is sent. Some embodiments automatically block a communication originating from, or being sent to, a stale number. For example, the communications network control system 14 may automatically prevent a call from being placed to a recipient device with a stale number in response to detecting a state number state, or in response to a stale number notification from the stale number detection device 60. In other embodiments, the request device may be prompted to proceed with or cancel a call, and a recipient device may be prompted to accept or deny a call. Accordingly, embodiments of the invention allow individuals and entities to avoid inconveniences and other issues related to stale contact information.

It should be noted that the references to voice telephone calls were provided as examples. As noted above, the systems and methods described above are not limited to voice telephone calls and may be used with the sending and receiving of text messages. It should also be noted that the systems and methods described above are not limited in their application to smart telephones or wireless communication devices. For example, methods 100, 200, and 300 may be utilized by an automated messaging system acting as the request device or as the device receiving a call or text message. In some embodiments, the systems and methods described above may be used to verify the status of non-telephonic contact information, including, for example, e-mail addresses, home addresses, business addresses, social media identifiers, and web page addresses. For example, an administrative device receives a request from a request device and, in response, compares the creation date of the non-telephonic contact information with the issue date of the non-telephonic contact information to determine whether the non-telephonic contact information is valid or stale.

Further details of such embodiment can be appreciated with reference to the above-described systems and methods.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "having," "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure, that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for detecting a stale number, the method comprising:
   receiving, via a wireless network interface, a call request from a portable communication device, the call request including a call number and a call number contact creation date for the call number;
   obtaining, by a processor in communication with the wireless network interface, a call number issue date for the call number;
   determining, by the processor, that a stale number state exists when the call number issue date is later than the call number contact creation date; and
   generating, by the processor, a stale number notification based on the stale number state.

2. The method of claim 1, further comprising denying, by the processor, the call request when the stale number state exists.

3. The method of claim 1, further comprising:
   determining, by the processor, a subscriber identifier based on the call number when the stale number state exists; and
   determining, by the processor, an active number based on the subscriber identifier;
   wherein the stale number notification includes the active number.

4. The method of claim 1, further comprising:
   sending, by the processor via the wireless network interface, the stale number notification to the portable communication device; and
   denying, by the processor, the call request.

5. The method of claim 1, further comprising:
   prompting, by the processor, for permission from a recipient device to complete the call request when the stale number state exists; and completing the call request, by the processor, when permission to complete the call request is received from the recipient device.

6. The method of claim 5, wherein completing the call request includes one of a group consisting of accepting a voice telephone call and accepting a text message.

7. The method of claim 1, further comprising:
sending, by the processor via the wireless network interface, the stale number notification to the portable communication device; and
completing the call request when permission to complete the call request is received from the portable communication device.

8. The method of claim 7, wherein completing the call request includes one of a group consisting of placing a voice telephone call and sending a text message.

9. A stale number detection device, the stale number detection device comprising:
a wireless network interface;
a memory having
an obtained call number issue date for the call number; and
a processor, coupled to the wireless network interface and the memory and configured to
receive, via the wireless network interface, a call request generated by a portable communication device, the call request including a call number and a call number contact creation date for the call number,
access the memory,
determine that a stale number state exists when the obtained call number issue date is later than the call number contact creation date, and
generate a stale number notification based on the stale number state.

10. The stale number detection device of claim 9, wherein the processor is further configured to deny the call request when the stale number state exists.

11. The stale number detection device of claim 9, further comprising an input/output interface coupled to a database, wherein the processor is further configured to
retrieve from the database a subscriber identifier based on the obtained call number when the stale number state exists;
retrieve from the database an active number based on the subscriber identifier; and
wherein the stale number notification includes the active number.

12. The stale number detection device of claim 9, wherein the processor is further configured to
send the stale number notification to the portable communication device via the wireless network interface; and
deny the call request.

13. The stale number detection device of claim 9, wherein the input/output interface is further coupled to a recipient device and the processor is further configured to
prompt for permission from the recipient device to complete the call request when the stale number state exists; and
complete the call request when permission to complete the call request is received from the recipient device.

14. The stale number detection device of claim 9, wherein completing the call request includes one of a group consisting of accepting a voice telephone call and accepting a text message.

15. The stale number detection device of claim 9, wherein the processor is further configured to
send the stale number notification to the portable communication device via the wireless network interface;
complete the call request when permission to complete the call request is received from the portable communication device.

16. The stale number detection device of claim 15, wherein completing the call request includes one of a group consisting of placing a voice telephone call and sending a text message.

17. The stale number detection device of claim 9, further comprising an input/output interface coupled to a database, wherein the processor is configured to retrieve from the database at least one from the group consisting of the call number, the call number contact creation date, and the obtained call number issue date.

18. The stale number detection device of claim 9, wherein the stale number detection device is incorporated into at least one from the group consisting of the portable communication device, a recipient device identified by the call number, and a communications network control system coupled to the portable communication device and the recipient device.

19. The method of claim 1, wherein receiving a call request from a portable communication device includes receiving a call request from one selected from the group consisting of a smart telephone, a portable radio, and a tablet computer.

20. The stale number detection device of claim 9, wherein the portable communication device is one selected from the group consisting of a smart telephone, a portable radio, and a tablet computer.

* * * * *